(12) United States Patent
Mukherjee

(10) Patent No.: US 7,039,431 B2
(45) Date of Patent: May 2, 2006

(54) SYSTEM FOR PROVIDING SUBSCRIBER FEATURES WITHIN A TELECOMMUNICATIONS NETWORK

(75) Inventor: Subrata Mukherjee, Plano, TX (US)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 590 days.

(21) Appl. No.: 09/971,378

(22) Filed: Oct. 4, 2001

(65) Prior Publication Data

US 2003/0069030 A1    Apr. 10, 2003

(51) Int. Cl.
*H04Q 7/20* (2006.01)

(52) U.S. Cl. ............... 455/461; 455/432.3; 455/414.3; 455/445

(58) Field of Classification Search .. 455/414.1–414.3, 455/550.1, 418–419, 461, 432.3, 445, 432.1–432.2, 455/426.1, 403, 433, 551, 552.1, 464, 554.1, 455/560, 555
See application file for complete search history.

(56) References Cited

U.S. PATENT DOCUMENTS

| | | | | |
|---|---|---|---|---|
| 5,867,570 | A * | 2/1999 | Bargout et al. | 379/221.13 |
| 5,970,059 | A * | 10/1999 | Ahopelto et al. | 370/338 |
| 6,029,065 | A * | 2/2000 | Shah | 455/414.4 |
| 6,185,425 | B1 * | 2/2001 | Lindgren et al. | 455/445 |
| 6,208,642 | B1 * | 3/2001 | Balachandran et al. | 370/385 |
| 6,597,910 | B1 * | 7/2003 | Ra | 455/433 |
| 6,683,881 | B1 * | 1/2004 | Mijares et al. | 370/401 |
| 6,687,243 | B1 * | 2/2004 | Sayers et al. | 370/356 |
| 6,697,620 | B1 * | 2/2004 | Lamb et al. | 455/432.1 |
| 6,754,482 | B1 * | 6/2004 | Torabi | 455/410 |
| 2002/0042832 | A1 * | 4/2002 | Fallentine et al. | 709/230 |
| 2004/0132449 | A1 * | 7/2004 | Kowarsch | 455/432.1 |

* cited by examiner

*Primary Examiner*—Lester G. Kincaid
*Assistant Examiner*—Marcos L. Torres

(57) ABSTRACT

A mobile subscriber registered with a private enterprise network and a public mobile network is provided with subscriber profile data triggering a serving switch associated with the public mobile network to forward an outgoing call connection request by that mobile subscriber over to the private enterprise network. Subscriber features and services available within the private enterprise network can then be utilized by the mobile subscriber currently roaming within the public mobile network while making outgoing call connections. Such subscriber profile data may be downloaded into the serving switch from a centralized database during its initial registration process.

20 Claims, 4 Drawing Sheets

SYSTEM FOR PROVIDING SUBSCRIBER FEATURES WITHIN A TELECOMMUNICATIONS NETWORK

BACKGROUND OF THE PRESENT INVENTION

1. Field of the Invention

The present invention relates to the implementation of telecommunications services within a plurality of telecommunications networks and, more particularly to a system, method and apparatus for providing a subscriber feature supported by a first telecommunications network to a mobile subscriber traveling within a second telecommunications network.

2. Background and Objects of the Present Invention

With the advent of mobile telecommunications networks, subscribers are able to travel freely within a particular service area and still enjoy the same telecommunications features and services associated with his or her home telecommunications service provider. However, due to a number of incompatible communication protocols and needs, a subscriber may still be assigned with two or more telephone directory numbers. For example, a subscriber may be assigned with a home telephone directory number as well as an office directory number. The subscriber may also be assigned with a mobile or cell number.

Although there is a great need and convenience in assigning and using a single telephone directory number to communicate with a particular subscriber, due to undesirable air-time and call connection charges levied by public telecommunications service providers, mid-to-large size companies and businesses would nevertheless prefer to maintain their own private communication systems. As an illustration, mid-to-large seize companies typically maintain a private branch exchange (PBX) for providing voice communication system within its premises. A subscriber can then establish a PBX call connection with another subscriber within the same PBX system without ever using the Public Switch Telephone Network (PSTN) or Public Land Mobile Network (PLMN). Since no PSTN or PLMN service was used in establishing that PBX call connection, no service charges would be levied against the PBX user by the public service provider.

Furthermore, many companies operate and maintain a local area network (LAN) for providing an independent data communication system within their working environment. Such LAN communication enables multiple users/subscribers to communicate and access Internet/intranet, emails and databases servers.

Furthermore, in order to introduce a converged network to handle all communications within a company, a private mobile telecommunications system also known as "Global System for Mobile System (GSM) on the Net" has been recently introduced. The GSM-on-the-Net is based on International Telecommunications Union ITU-T Recommendation H.323, which describes terminals, equipment and services for multimedia communication over a packet based network. As an illustration, all nodes in GSM-on-the-Net are connected to a corporate Intranet, and communication between the system nodes and radio access nodes providing wireless radio interface to terminals is handled over the Internet Protocol (IP) over the existing corporate Intranet connection. Accordingly, instead of using telephone numbers and separate PBX telecommunications network, the GSM-on-the-Net uses IP addresses and ports to ensure that data and signaling flows are routed to the correct destinations over an existing packet network (LAN).

Reference is now made to FIG. 1 wherein a block diagram of a GSM-on-the-Net is illustrated. For illustrative purposes, the GSM-on-the-Net is used to describe the implementation associated with the present invention. Notwithstanding the above, the present invention can be utilized within any enterprise mobile network and public mobile network. The advantage of the GSM-on-the-Net system is providing mobile telecommunications service over an existing IP network, such as a corporate LAN system. As a result, the same IP LAN system provides the data communication capability, such as emails, database server access, computer networking, etc., as well as providing the voice communications within a particular corporate environment.

As an illustration, a mobile station 10A requests an outgoing call connection while traveling within a GSM-on-the-Net service area 100. This mobile station 10A could be a typical GSM mobile station utilizing the standardized GSM air-interface and associated protocols. However, other mobile stations utilizing different protocols and interfaces could also be applicable in accordance with the present invention. A base transceiver station (BTS) 110 serving a particular geographic location associated with the requesting mobile station 10A then receives the service request and transmits the same to an associated radio network server (RNS) 130. For illustrative purposes, an RNS is similar to a base station controller (BSC) within a GSM or other similar PLMN systems. Since all communication between the BTS 110 and the associated RNS as well as any other elements or nodes within the GSM-on-the-Net system are performed over an existing IP network 120, the serving BTS 110 needs to packetize the received request information from the mobile station 10A. Such an interworking or packetization is required to transport the data over the connected IP connection 120 or 125. Accordingly, an Abis Gateway (Abis GW) 115 associated with the serving BTS 110 reformats and packetizes the received GSM data within an IP packet to be transported over the IP connection 120/125 to the serving RNS 130. The RNS 130, in turn, transmits the call connection request encapsulated within the received IP packet to an associated network access controller (NAC) 140 over an IP connection 135. The NAC performs similar functions as a mobile switching center (MSC) within a conventional PLMN system. The serving NAC 140 then communicates with a connection control node within the enterprise system, also known as a GateKeeper (GK) 150, to request and receive proper call handling instructions for this particular call connection. As an example, if the outgoing call connection request was towards a called party subscriber outside of the GSM-on-the-Net network 100, the GK 150 forwards the call connection request to a gateway (GW) node 200 interfacing the GSM-on-the-Net network with the outside PLMN and PSTN 180 over an IP connection link 165. An SS7 GW 160 within the GW 200 would reformat the IP packet into an appropriate PLMN or PSTN signal, such as an SS7 initial address message (IAM) signal, and forwards it over to the associated VGW 170. The VGW 170, in turn, forwards the received signal over to the associated PSTN or PLMN over its trunk connection 185. As a result, a call connection between the originating mobile subscriber 10B and the called party mobile subscriber 10C is established over two different networks.

On the other hand, if the called party subscriber is another GSM-on-the-Net subscriber being served within the same enterprise network, the GateKeeper (GK) 150 communicates with associated NAC 140, RNS 130, and BTS 110 currently serving that destination mobile station 10B to establish a call connection therebetween.

As illustrated, one of the advantages of the GSM-on-the-Net enterprise system is the capability to provide mobile service within a corporate environment while utilizing the existing IP infrastructure. Accordingly, the same IP infrastructure is also used by the corporation to provide its LAN/WAN capabilities. Furthermore, since this is a private network, a number of enhanced subscriber services and features can further be provided to its members. Such services and features include speed dialing, short dialing, corporate long distance services, conference calls, etc. As the mobile station 10A roams out of the GSM-on-the-Net network and into an existing PLMN 180, the mobile station automatically detects the new service provider and switches over to a particular public service provider currently providing radio coverage over that geographic area. As a result, the mobile subscriber is able to maintain one telephone number as well as one mobile terminal device while freely traveling in and out of its private enterprise network.

However, when the mobile station 10A is outside of its GSM-on-the-Net network 100 and being served by a PLMN 180, all of the features, services, and added securities of the private enterprise network (e.g., GSM-on-the-Net) are no longer available to the mobile subscriber. The mobile station 10A merely functions as a typical mobile station within that PLMN 180 having access to only those services provided therein until the mobile station 10A roams back into the GSM-on-the-Net coverage area.

Accordingly, there is a need for a mechanism to enable a GSM-on-the-Net mobile station to have access to its private enterprise network features and services even when the mobile station is outside of the GSM-on-the-Net environment and being served by a PLMN.

SUMMARY OF THE INVENTION

The present invention discloses a method and apparatus for enabling a private enterprise mobile station to have access to its private subscriber features and services while traveling outside of its enterprise mobile service area. In one aspect, the present invention discloses such method features and services within a GSM-on-the-Net system. When an outgoing call connection request is received by a mobile switching center (MSC) associated with a public land mobile network (PLMN) serving a particular mobile station, the MSC determines whether a call handling instruction is needed from an associated GSM-on-the-Net system. In response to an affirmative determination, the MSC forwards the call connection request to the determined GSM-on-the-Net system. The GSM-on-the-Net system then re-originate an outgoing call connection using that received request thereby enabling the mobile station to establish a call connection towards a particular called party subscriber through his or her home GSM-on-the-Net system. The GSM-on-the-Net system is thus able to provide its enterprise network associated subscriber features and services to the mobile station even though the mobile station is located outside of its service area.

In one aspect, the present invention provides a method and apparatus for detecting a mobile station associated with a particular private enterprise radio network, such as a GSM-on-the-Net system, and routing a mobile call connection request originated by the mobile station from a serving PLMN to the associated GSM-on-the-Net system. In another aspect, the present invention provides an enterprise mobile system for providing a modified B-number to enable the serving MSC to forward an outgoing call connection towards a particular gateway serving the enterprise mobile system.

In yet another aspect, the present invention provides a method and apparatus for providing enhanced features and services associated with a private enterprise mobile network to a mobile station traveling outside of its service area.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE INVENTION

Although the method and apparatus of the present invention can be practiced using any one of the mobile telephone network protocols, the preferred embodiment of the present invention is described as being deployed using the Global System for Mobile Communications (GSM) standard.

Figure 1:
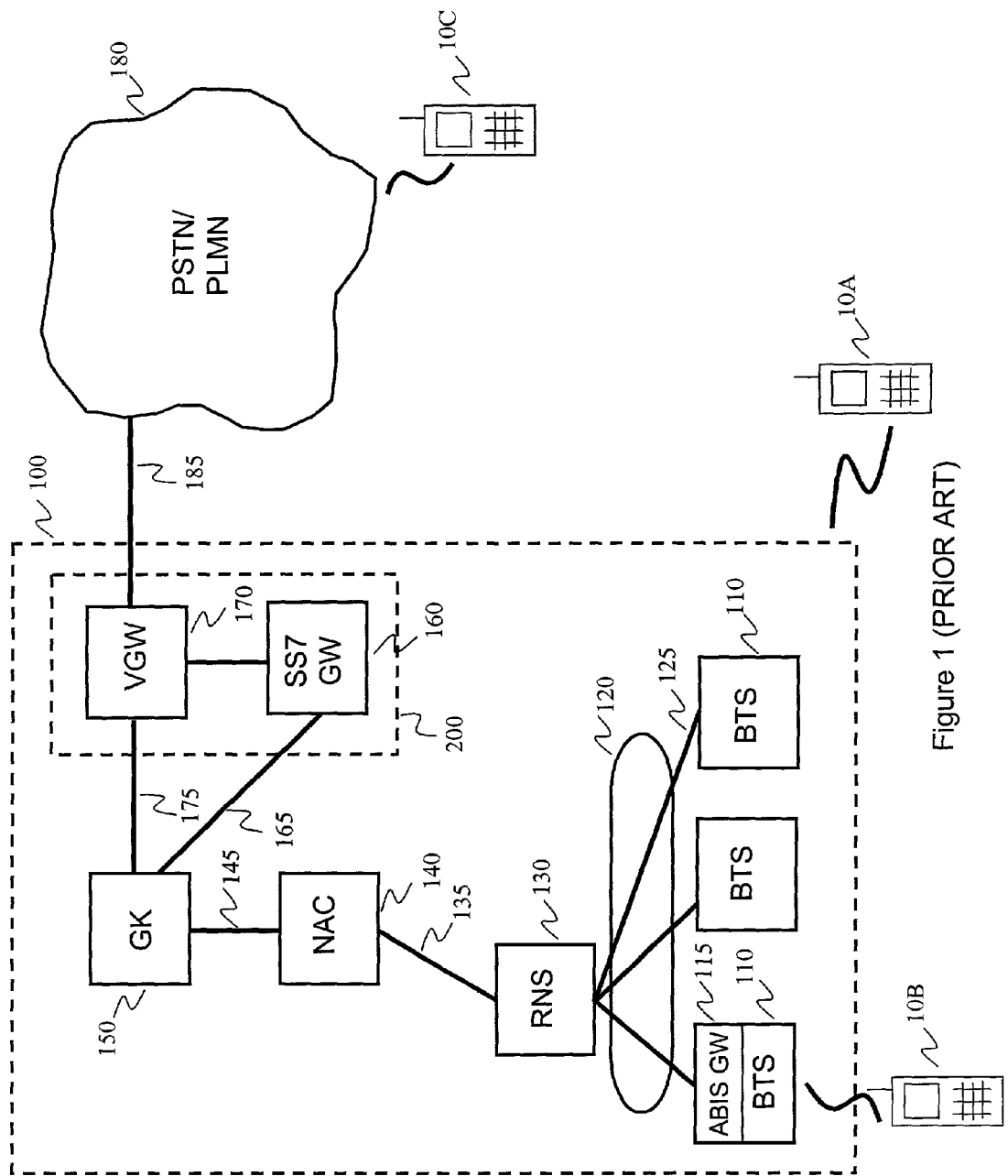
FIG. 1 is a block diagram of a Global System for Mobile Communications (GSM) on the Net architecture.
Figure 2:
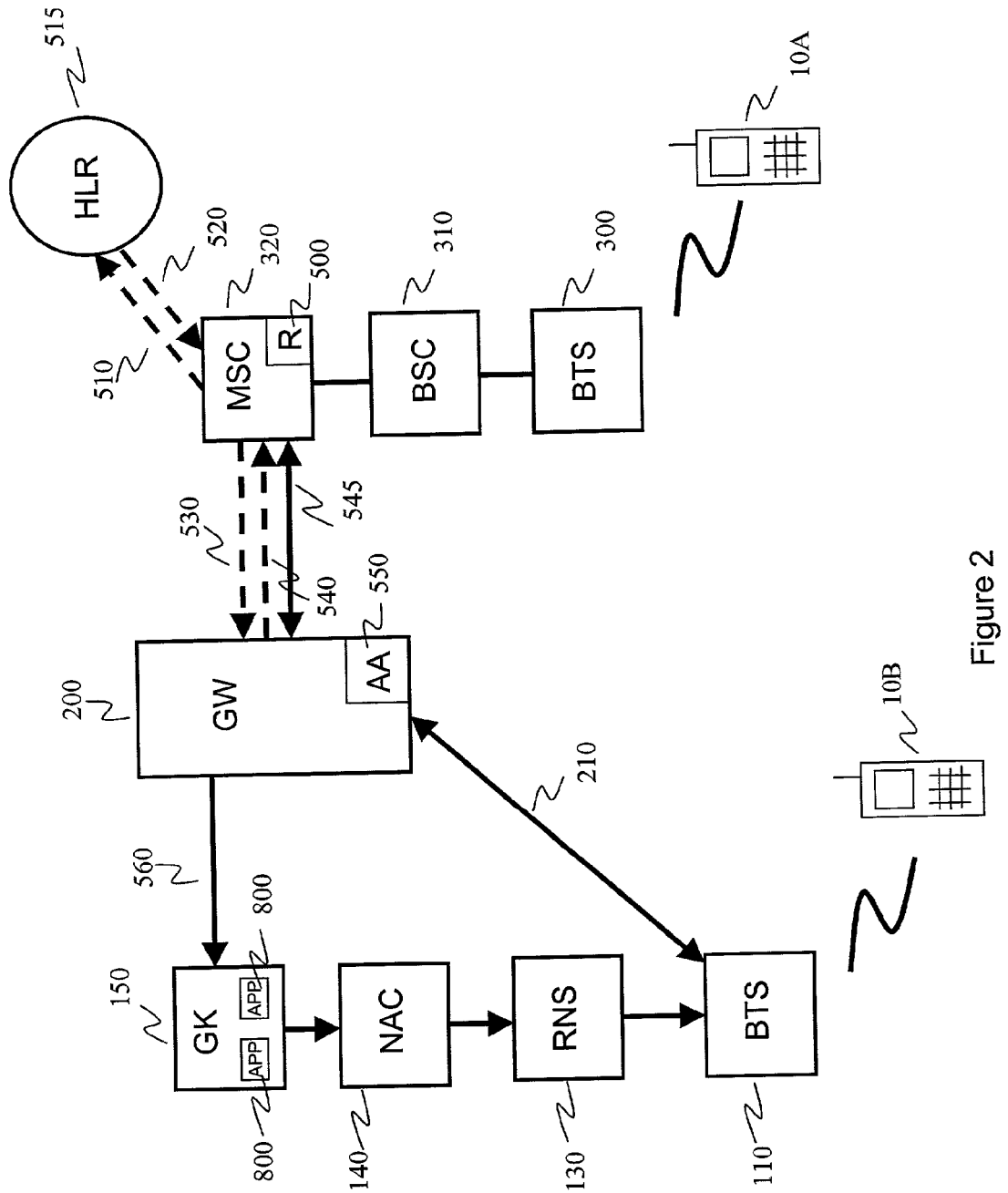
FIG. 2 is a block diagram of a Public Land Mobile Network (PLMN) interacting with the GSM-on-the-Net in accordance with the teachings of the present invention.

Referring now to FIG. 2, a block diagram of a Public Land Mobile Network (PLMN) interacting with the GSM-on-the-Net is illustrated in accordance with the teachings of the present invention. When a mobile station 10A travels or roams into a particular geographical area being served by a base transceiver station (BTS) 300 associated with a particular Public Land Mobile Network (PLMN), the serving BTS 300 detects the presence of the mobile station 10A and initiates a registration process to authenticate and to register the newly detected user. Accordingly, the registration signal is forwarded to a serving mobile switching center (MSC) 320 associated with that particular BTS 300 through a base station controller (BSC) 310. The MSC 320 determines the identity of a home location register (HLR) 515 or any other master database assigned to maintain subscriber information associated with the mobile subscriber 10A and transmits a registration signal over a connection-less signal link 510 thereto. The HLR 515, in response, authenticates the registering subscriber and downloads certain subscriber information to the serving MSC 320 over a communication link 520. The downloaded subscriber information, for example, contains the newly registered user's billing information, enhanced feature capabilities, etc. Additionally, one of the downloaded subscriber profile data include the subscriber's Originating Intelligent Network (IN) Trigger (OICK) values. The provided OICK value is then stored within a register 500 within the serving MSC 320. Alternatively, the downloaded OICK value may be stored within a visitor location register (VLR, not shown in FIG. 2) associated with the serving MSC 320.

The serving MSC 320 typically references the stored OICK value to determine the outgoing call connection capabilities whenever the mobile subscriber 10A originates a call connection. Accordingly, when the mobile subscriber 10A requests an outgoing call connection, the serving MSC 320 determines that a specific OICK value has been triggered for this particular subscriber and functions as a Service Switching Function (SSF) within an Intelligent Network to send an IN request to a specified Service Control Point (SCP). The purpose of an OICK value is to trigger the serving MSC to inquire call handling instructions for a particular subscriber from his or her assigned call control node. In response to such an IN request, the SCP reviews the outgoing call connection request and provides the requesting MSC with appropriate call handling instructions.

In accordance with the teachings of the present invention, the downloaded subscriber profile OICK value instructs the serving MSC 320 to transmit the IN request to a particular enterprise mobile system, such as the GSM-on-the-Net. Accordingly, when the mobile subscriber 10A originates an outgoing call connection request towards a particular destination subscriber (e.g., called party subscriber), the serving BTS 300 intercepts the radio signal and forwards the call connection request to the serving MSC 320 via the BSC 310. The serving MSC 320 reviews the OICK value stored within the register (R) 500 and determines that an IN request needs to be transmitted to the specified enterprise mobile system. As an example, an SS7 point code may be identified for that particular OICK value thereby providing the serving MSC with a destination address associated with a particular node within the enterprise mobile system. Such a node may be a gateway node 200 within a GSM-on-the-Net system. As a result, the serving MSC 320 transmits a signal to GW 200 associated with the enterprise network associated with the mobile station 10A requesting the B-number (B-num) to be modified. As far as the serving MSC is concerned, this step is performed in accordance with the conventional IN signaling procedure. An Access Agent (AA) 550 associated with the GW 200 then realizes that this is an IN query 530 from a MSC associated with a public network currently serving one of its enterprise subscribers and assigns a routing number associated with the serving GW 200. The assigned routing number is then provided back to the serving MSC 320, for example, as a modified B-number 540. Since the serving MSC 320 considers the GW 200 as an SCP associated with the assigned OICK value, the serving MSC 320 further considers the received modified B-number as an instruction from the SCP to change the destination address and to reroute the outgoing call connection using the newly provided destination address. Accordingly, the serving MSC 320 originates an outgoing call connection using the modified B-number containing the original B-number as provided by the mobile subscriber 10A. In a conventional manner, the serving MSC thereby originates a call connection request signal, such as an Initial Address Message (IAM) signal, using the provided modified B-number as the destination address. The originated call connection is accordingly routed to the GW 200, and as a result, a call connection is established between the serving MSC 320 within the PLMN and the GW 200 within the GSM-on-the-Net.

Upon receiving the incoming call connection at GW 200, the AA 550 determines that the specified B-number is the one previously assigned by the AA 550 itself and removes the prepended number to retrieve the original B-number as specified by the mobile station 10A. The received incoming call connection is then forwarded to a GateKeeper (GK) 150. The GK 150 is a call control node within the GSM-on-the-Net system and performs a function similar to a mobile switching center (MSC) within a PLMN providing a number of enhanced subscriber features and services 800 therein.

In the event the original B-number is associated with another mobile station 10B currently registered (being served) within the same GSM-on-the-Net system, the GK 150 forwards the call connection to the NAC 140, which in turn, forwards the incoming call connection request to a serving RNS 130. Similar to a conventional manner, the RNS 130 then forwards the call connection to a particular BTS 110 currently serving the destination mobile station 10B. Once the call setup has been completed with the mobile station 10B, a call connection is established from the original mobile station 10A through its BTS 300, BSC 310, and the serving MSC 320 on the originating side. The call connection is then maintained between the serving MSC 320 and the GW 200 over a circuit connection 545. The GW 200 then packetizes the received PLMN data over IP packets and transmits them directly to the identified BTS 110 over an existing IP network maintained by the enterprise system. The BTS 110 then removes the GSM data encapsulated within the received IP packets and communicates the received GSM data over a radio connection to the destination mobile subscriber 10B. Accordingly, the serving GK 150, NAC 140, and RNS 130 are utilized for handling any signaling and call control requirements, but a direct data pipeline 210 is established for communicating data payload between the GW 200 and the serving BTS 110.

Even though the originating mobile subscriber 10A was roaming outside of the enterprise network, since the requested call connection was intercepted or handled by a GK 150 within his home GSM-on-the-Net system, all subscriber features and services available within the GK 150 could be utilized by the originating mobile subscriber 10A when making an outgoing call connection in accordance with the teachings of the present invention.

Figure 3:
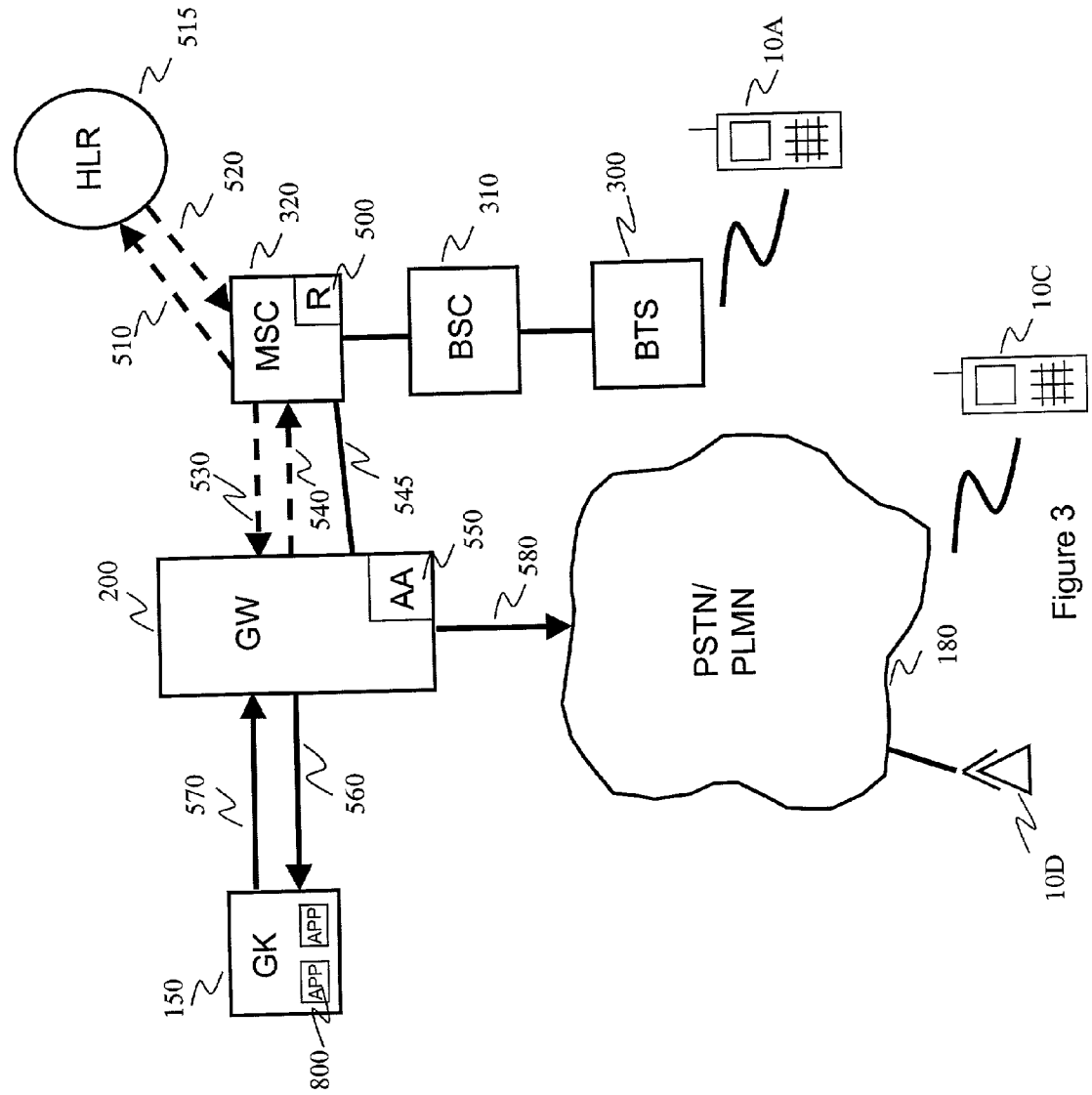
FIG. 3 is a block diagram of a mobile station originating an outgoing call connection towards another mobile station traveling outside of the specified enterprise mobile network.

Reference is now made to FIG. 3 illustrating a block diagram of a mobile station originating an outgoing call connection towards another mobile station traveling within a PLMN. In a manner similar to as described in FIG. 2, the mobile station 10A originates an outgoing call connection request towards a particular mobile station 10C (or alternatively to a fixed line terminal 10D). The serving BTS 300 receives the radio signal transmitted by the originating mobile station 10A and forwards it over to the associated MSC 320 via the serving BSC 310. The serving MSC then determines that a particular OICK value stored in the register (R) 500 has been specified for this originating mobile subscriber and initiates an IN request (signal link 530) towards the GW 200 specified as the associated SCP. As more fully described above, the OICK value was downloaded from the associated HLR 515 during the registration process when the mobile station first roamed into this particular service area (signal links 510 and 520). The GW 200 then instructs the serving MSC to forward the outgoing call connection to the enterprise mobile system by providing the MSC with a modified B-number representing the GW itself (signal link 540). The serving MSC 320 then initiates an SS7 call setup signal, such as an IAM signal, using the provided modified B-number. As a result, a trunk connection is established between the serving MSC 320 and the GW 200. The AA 550 within the GW 200 receives the call connection and determines that this is an outgoing call connection initiated by one of its GSM-on-the-Net subscribers roaming outside of the enterprise network. The AA 550 associated with the serving GW 200 then restores the original B-number and forwards the received call connection (signal link 560) to the GK 150.

The serving GK 150 considers this event as a typical call connection originated by one of its enterprise mobile subscribers within its enterprise service area. Accordingly, all subscriber features and services 800 available within the GK 150 could now be provided to the originating mobile subscriber 10A. The GK 150 then determines that the original destination subscriber is a terminal located outside of the enterprise network and re-transmits the outgoing call connection (signal link 570) back out to the GW 200. This retransmission is performed in a manner similar to an outgoing call connection originated by a GSM-on-the-Net subscriber roaming within the enterprise network. Accordingly, the GW 200 merely determines the appropriate neighboring Public Switched Telephone Network (PSTN) or PLMN network 180 to route the requested call connection (signal link 580) in a conventional manner. A call connection is thereafter established between the originating mobile station 10A and the destination mobile station 10C, or alternatively with the fixed line terminal 10D.

Figure 4:
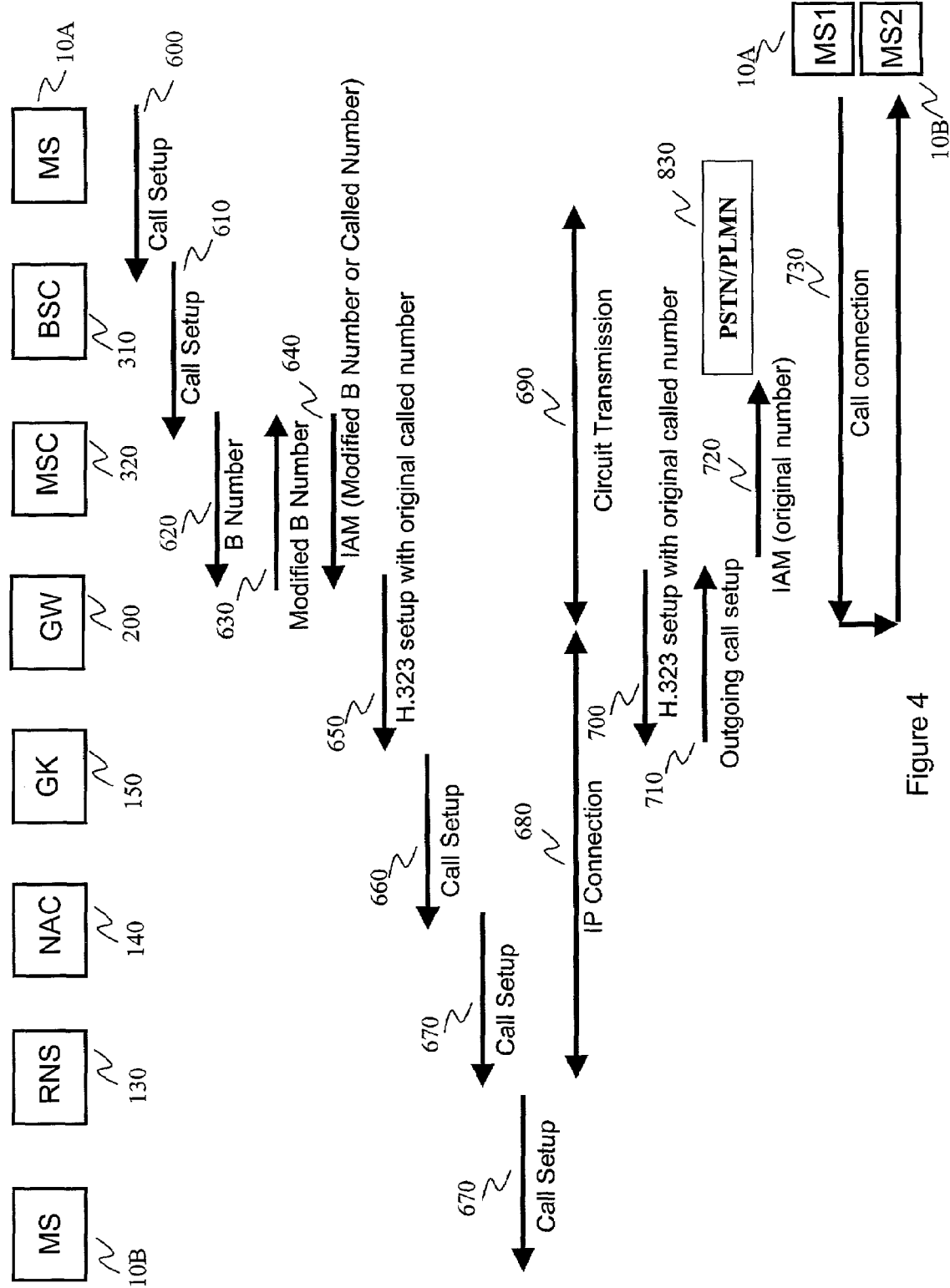
FIG. 4 is a signal flow diagram illustrating the sequence of signals communicated between different network elements in accordance with the teachings of the present invention.

FIG. 4 is a signal flow diagram illustrating the sequence of signals communicated between different network elements in accordance with the teachings of the present invention. A mobile station (MS) 10A roaming within a public switched telephone network (PSTN) originates an outgoing call connection request by transmitting a call setup signal 600 over a radio frequency channel allocated between the mobile station 10A and a serving BSC 310 (via base transceiver station serving that particular location area). The serving BSC 310 then forwards a call setup signal (message) 610 over to an associated MSC 320. The serving MSC 320 then determines that this mobile subscriber is associated with a particular OICK value and that the serving switch needs to request IN instruction from a specified service control point (SCP). The serving MSC 320 then transmits an IN request signal 620 to a gateway (GW) 200 specified by the OICK value as the associated SCP. Such signal is a request for the SCP to modify the received B-number. The GW 200 then determines in accordance with the teachings of the present invention that this IN request is associated with a mobile subscriber registered with its enterprise system and provides the requesting MSC with an instruction to forward the outgoing call connection over to the GW 200. The GW 200 may provide such instruction by providing the serving MSC 320 with a modified B-number 630 representing the GW 200. While providing the modified B-number, the routing number representing the GW 200 is prepended to the original B-number identified by the mobile station 10A. The serving MSC 320, in response to receiving the modified B-number, initiates another outgoing call connection using the received modified B-number as the new destination address. Such an outgoing call connection could be originated by an Initial Address Message (IAM) SS7 signal 640 using the modified B-number as the called party number (cdpn).

As a result, a truck call connection is established between the serving MSC 320 and the GW 200 associated with a private enterprise system. The GW 200, in response to receiving the incoming call connection, determines that the called party number matches one of the numbers associated with the GW 200 and strips the previously prepended prefix from the received called party number. The original B-number is then recovered and forwarded over to a switching element 650, such as the GateKeeper (GK) 150 within the private enterprise network system. As fully described above, since the private enterprise network system may use an existing LAN system to communicate actual data, the GW 200 may then need to perform necessary interworking functions to transport the received SS7 data over an IP network. Accordingly, a H.323 setup signal 650 with the original called party number is transmitted from the GW 200 to the GK 150.

The GK 150 then determines that the called party number is associated with one of its own mobile subscribers currently traveling within its enterprise network area and forwards the incoming call connection 660 to the NAC 140 serving that particular mobile subscriber. The NAC 140 thereafter forwards the call setup request 670 to the RNS 130 associated with a particular BTS (not shown) currently providing the radio coverage for that called party mobile station 10B. As a result, the MS 10B is paged and a call connection is thereafter established.

As fully described above, an IP data connection is established from the BTS serving the mobile station 10B to one end of the GW 200 and a circuit or PSTN connection is established from the other end of the GW 200 to the BTS serving the originating mobile station 10A.

As further illustration of the advantages of the present invention, the GK 150 may also determine that the dialed number by the originating mobile subscriber 10A is a PBX abbreviated number and handle the call connection accordingly. The GK 15 is similarly capable of determining that the dialed number is a service code for a particular subscriber service and providing the associated subscriber service towards the requesting mobile subscriber 10A.

As an alternative, if the called party subscriber is another subscriber located outside of the enterprise network, in response to receiving the H.323 call setup signal 700, the GK 150 re-transmits the call setup 710 to the GW 200. The GW 200 then originates a conventional outgoing call connection request, such as an SS7 IAM signal 720, over to an associated public switching network 830. In accordance with the teachings of the present invention, the call connection 730 between the originating mobile station 10A and the destination mobile station 10B is therefore established via the serving GW 200. Although the call connection is between two mobile stations roaming or traveling outside of a particular enterprise mobile system, since the GK 150 and GW 220 were involved in the call connection setup, all features and services associated with the GK 150 could be utilized by the originating mobile subscriber 10A while making the outgoing call connection in accordance with the teachings of the present invention.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications, and substitutions without departing from the spirit of the invention as set forth and defined by the following claims.

The invention claimed is:

1. A method for providing a mobile communication service to a mobile station wherein said mobile station has subscription with a first telecommunications network and a second communications network and said mobile station has subscription to access one or more subscriber features associated with said second telecommunications network, comprising the steps of:

receiving a request for call control instruction within said second telecommunications network from said first telecommunications network, wherein said first telecommunications network is currently providing radio access to said mobile station and said request for call control instruction is associated with a request for outgoing call connection from said mobile station towards a particular called party number;

instructing said first telecommunications network to forward said received request for outgoing call connection to said second telecommunications network wherein said step of instructing further includes a particular internal routing number associated with the second telecommunications network and to be used by said first telecommunication network in forwarding said outgoing call connection;

receiving said requested outgoing call connection from said first telecommunication network, said outgoing call connection including said particular internal routing number and said called party number;

processing said requested outgoing call connection towards said particular called party by stripping said internal routing number from said called party number and generating said original called party number, said original called party number being the called party number as requested by said particular mobile station and thereby establishing a call connection between said mobile station and said called party through said second telecommunication network; and further providing said one or more subscriber features associated with said second telecommunications network to said mobile station traveling within geographic area covered by said first telecommunications network.

2. The method of claim 1 further comprising the initial steps of:

storing a particular subscriber profile data within a centralized database associated with said mobile station within said first telecommunications network; and downloading said stored subscriber profile data to a particular switch within said first telecommunications network, wherein said downloaded subscriber profile data instructs said switch to request call handling instruction from said second telecommunications network in response to receiving a request for outgoing call connection from said mobile station.

3. The method of claim 2 wherein said step of storing comprises the step of storing said subscriber profile data within a home location register (HLR) serving said mobile station.

4. The method of claim 2 wherein said step of downloading said stored subscriber profile data is performed when said mobile station roams into said first telecommunications network and performs a location update.

5. The method of claim 2 wherein said subscriber profile data is stored as an Originating Intelligent Network Trigger (OICK).

6. The method of claim 1 wherein said step of processing said requested outgoing call connection comprises the step of originating an initial address message (IAM) signal towards said called number within said second telecommunications network.

7. The method of claim 1 wherein said first telecommunications network comprises a private radio communication network and said second telecommunications network comprises a public land mobile network (PLMN).

8. A private telecommunications system serving a plurality of mobile stations and connected to a public telecommunications system wherein said plurality of mobile stations are further capable of communicating with said public telecommunications system, comprising:

a gateway module for receiving an incoming call connection from said public telecommunications system wherein said incoming call connection is requested by one of said plurality of mobile stations traveling within said public telecommunications system and further comprises a called party number;

an access module associated with said gateway module for determining whether said called party number comprises a particular internal routing number wherein said internal routing number was previously provided by said gateway module to said public telecommunications system in response to receiving a call connection control request associated with said mobile station;

said access module, in response to an affirmative determination, stripping said internal routing number from said received called party number and generating an original called party number, said original called party number being the called party number as requested by a particular mobile station; and call connection module for processing a call connection using said original called party number as the destination address wherein said call connection module is associated with a plurality of subscriber features to be accessed by said mobile station requesting an outgoing call connection and providing associated subscriber features and functions over said call connection.

9. The private telecommunications system of claim 8 wherein said original called party number represents a called party outside of said private telecommunications system and said call connection module originating an outgoing call connection using said original called party number as the destination address.

10. The private telecommunications system of claim 9 wherein said access module provides a routing number in response to a request for call handling from said public telecommunications system, wherein said routing number further comprises said internal routing number appended to said original called party number.

11. The private telecommunications system of claim 8 wherein said call connection module comprises a Gatekeeper within a private radio network system.

12. The private telecommunications system of claim 8 wherein said public telecommunications system further comprises:

a call handling switch for receiving a request to originate an outgoing call connection from said one of said plurality of mobile stations; and a subscriber profile record containing data indicating that said call handling switch needs to request call handling instruction from said gateway module within said private telecommunications system.

13. A method for providing outgoing call connection and telecommunications services to a mobile station, wherein said mobile station is communicable with a first telecommunications network and a second telecommunications network and wherein said second telecommunications network is associated with a plurality of subscriber services, comprising the steps of:

receiving a request to establish an outgoing call connection from said mobile station by a call handling device within first telecommunications network, said request comprising a particular called party number;

determining that a request for call handling instructions need to be provided to said second telecommunications network;

requesting said call handling instruction from said call handling device to said second telecommunications network in response to said determination;

instructing said call handling device to forward said outgoing call connection request to said second telecommunications network wherein said step of instructing further includes a particular internal routing number associated with the second telecommunications network and to be used by said first telecommunication network in forward said outgoing call connection;

receiving said requested outgoing call connection from said first telecommunication network, said outgoing call connection including said particular internal routing number and said called party number;

processing said requested outgoing call connection towards said particular called party by stripping said internal routing number from said called party number and generating said original called party number, said original called party number being the called party number as requested by said particular mobile station;

establishing an outgoing call connection towards said original called party number from said second telecommunications network; and allowing said mobile station to access one or more of said plurality of subscriber services associated with said second telecommunications network.

14. The method of claim 13 further comprising the initial steps of:

determining the presence of said mobile station within said first telecommunications network;

retrieving subscriber profile data from a central database associated with said mobile station; and storing said retrieved subscriber profile data within said call handling device within said first telecommunications network.

15. The method of claim 14 wherein said subscriber profile data comprises originating intelligent network trigger (OICK) value.

16. The method of claim 13 wherein said step of determining that said request for call handling instruction need to be provided to said second telecommunications network comprises the step of evaluating said subscriber profile data associated with said mobile station.

17. The method of claim 13 wherein said step of instructing said call handling device to forward said outgoing call connection request comprises the step of providing the call handling device with a modified B-number from said second telecommunications network, wherein said modified B-number represents a particular device within said second telecommunications network as the calling party.

18. The method of claim 13 wherein said step of establishing said outgoing call connection towards said particular called party number comprises the step of transmitting an initial Address Message (IAM) signal from said second telecommunications network.

19. The method of claim 13 wherein said first telecommunications network is a public land mobile network (PLMN) and said second telecommunications network is a private radio network.

20. The method of claim 13 wherein said step of instructing said call handling device to forward said outgoing call connection is performed within a gateway node within said second telecommunications network.

* * * * *

UNITED STATES PATENT AND TRADEMARK OFFICE
CERTIFICATE OF CORRECTION

PATENT NO. : 7,039,431 B2  Page 1 of 1
APPLICATION NO. : 09/971378
DATED : May 2, 2006
INVENTOR(S) : Mukherjee It is certified that error appears in the above-identified patent and that said Letters Patent is hereby corrected as shown below:

In Column 11, Line 10, in Claim 13, delete "forward" and insert -- forwarding --, therefor.

Signed and Sealed this

Eighteenth Day of December, 2007

JON W. DUDAS
*Director of the United States Patent and Trademark Office*